Nov. 19, 1935.  A. H. REIBER  2,021,382

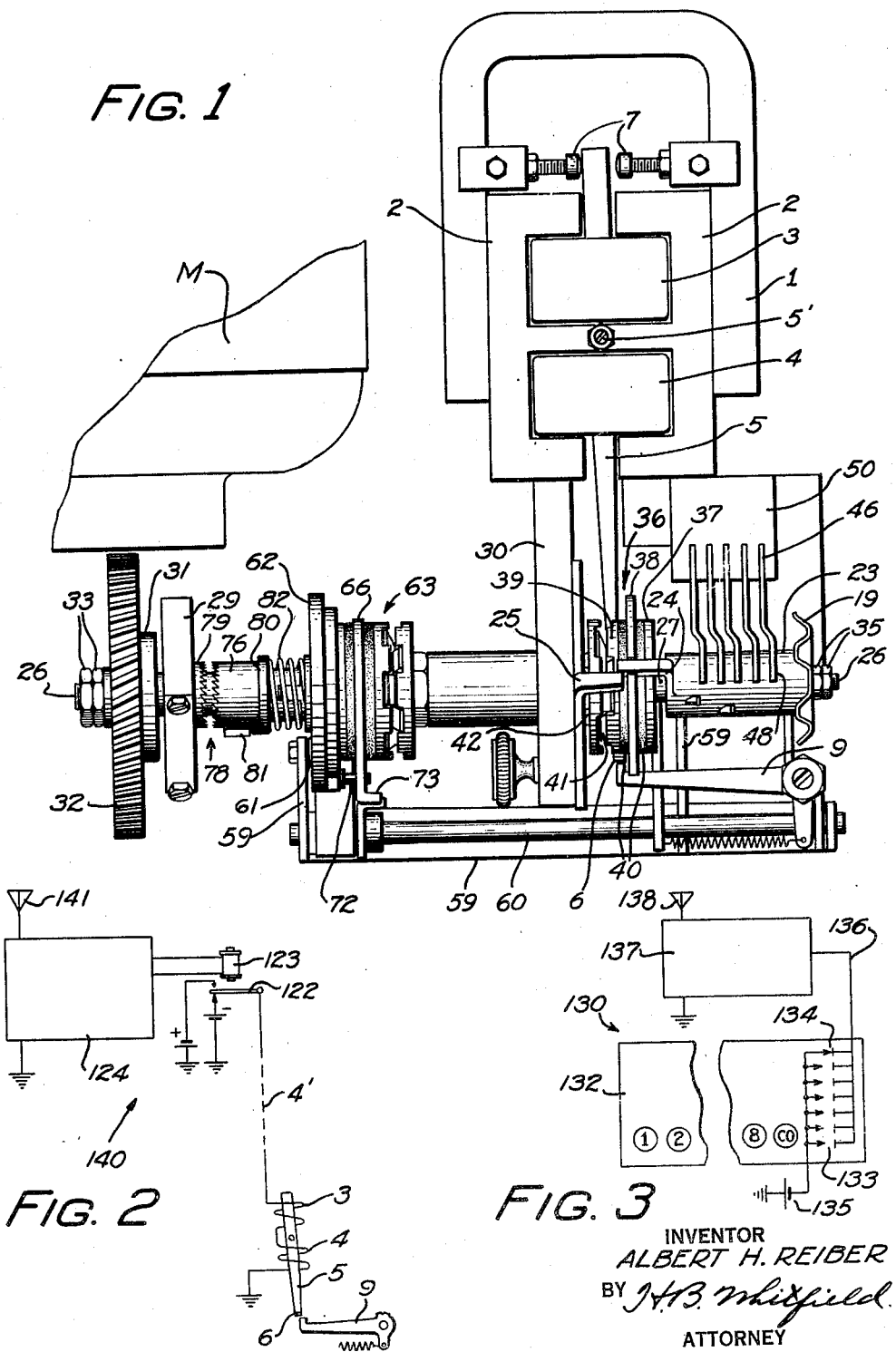

REMOTE CONTROL SYSTEM

Filed Feb. 5, 1932  3 Sheets-Sheet 2

INVENTOR
ALBERT H REIBER
BY H.B. Whitfield
ATTORNEY

Patented Nov. 19, 1935

2,021,382

UNITED STATES PATENT OFFICE 2,021,382

REMOTE CONTROL SYSTEM

Albert H. Reiber, Chicago, Ill., assignor to Teletype Corporation, Chicago, Ill., a corporation of Delaware Application February 5, 1932, Serial No. 591,167

7 Claims. (Cl. 177—353)

This invention relates to methods of and systems for remote control and more particularly to such methods and systems arranged to prevent extraneous interference and is a continuation in part of abandoned application Serial No. 328,544 filed December 26, 1928.

Systems in which remotely disposed units are selectively controlled to perform various operations practically eliminate the use of attendants at each of a plurality of points where controlled apparatus are located by providing controlling apparatus at a centralized point where a single operator may have under direct control all remotely disposed apparatus. This not only eliminates attendants but provides systems of great flexibility because of this common control. Such systems are moreover essential in cases where controlled apparatus is located at a position not easily accessible by an attendant or in cases where for any special reasons, it is desired that apparatus be remotely controlled.

Remote control systems, however, have encountered difficulties due to interference from extraneous sources on the signalling system which in some instances has caused incorrect operation of a remote unit. These interferences may be due to extraneous electrical conditions or to deliberate intrusion on the system by unauthorized individuals. This is done by tapping signalling wires, or in the case of radio to which the system of this invention is particularly adapted by merely transmitting interfering signals on the same wave length.

An object of this invention therefore is to provide a simple, reliable and efficient selective control apparatus for communication purposes.

The mechanism of this invention comprises a mechanical selector, controlled by received signals, and operating mechanically to select and to operate any desired one of a number of local selector contacts, and, in connection with the selector contacts, a system of relays and interdependent circuits such as to determine the order in which the selector contacts must be operated to effect a desired control of remote working devices.

A clear understanding of the invention may be had from the following description, taken in conjunction with the accompanying drawings, wherein;

Fig. 1 is a plan view of apparatus used in the system of this invention.

Fig. 2 shows a radio receiving station.

Fig. 3 shows a radio sending station.

Figure 4:
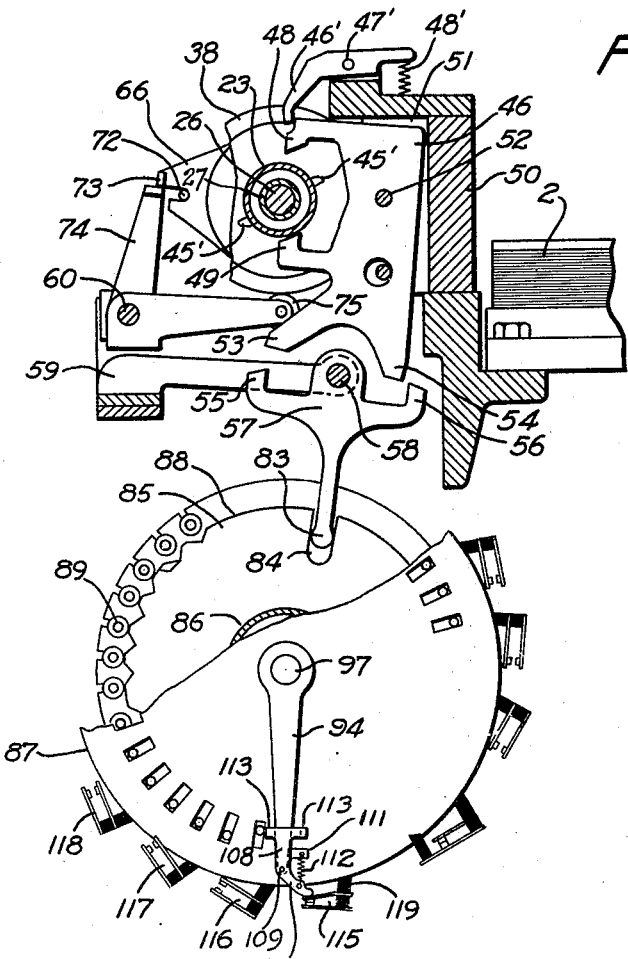
Fig. 4 is a front sectional view of the structure shown in Fig. 1.

Referring to Fig. 1 the selecting mechanism is controlled by a single selector magnet. As shown, the selector magnet is of a polarized type and comprises a permanent U-shaped magnet 1 surrounding the pole pieces 2. Disposed between the pole pieces 2 are the magnet windings 3 and 4 which are energized in accordance with impulses received over a signalling line 4' to operate the armature 5. Armature 5 is pivotally supported on the armature bearing 5' and has an extension tip 6 formed on one end thereof. The motion of the armature 5 is limited by the adjustable screws 7, adapted to separately engage the opposite sides of the inner end of the armature 5.

Figure 6:
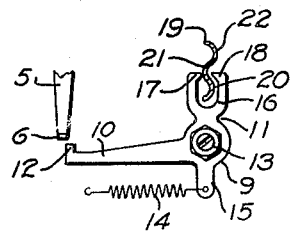
Fig. 6 shows details of the flutter lever of Fig. 1.

As the armature 5 energizes and reverses in polarity in accordance with marking and spacing impulses received over the signalling line, the extension 6 of armature 5 is moved into and out of the path of a flutter lever 9 shown in detail in Fig. 6. The flutter lever 9 comprises two arms 10 and 11 arranged substantially at right angles to each other, the outer end of the arm 10 having a stop 12 formed thereon and adapted when the armature 5 is moved to the right to engage the extension 6 thereof. The flutter lever 9 is pivotally mounted on a fixed pivot 13 about which it is normally urged in a clockwise direction by spring 14, one end of which is secured to the frame and the other end to an extension 15 on the flutter lever 9. The other arm 11 of the flutter lever 9 terminates in a bifurcated jaw 16 having extensions or cam followers 17 and 18 formed thereon. For a more detail explanation of the structure, reference may be had to U. S. Patent 1,821,110 issued September 1, 1931 to S. Morton et al.

In operative relation with the bifurcated jaw 16 is the flutter cam 19 having a plurality of radially arranged right and left corrugations or apexes such as 20, 21 and 22 formed thereon and disposed at equal distances from the median plane thereof. The apex of each corrugation alternately engages one of the extensions or followers 17 or 18 of the bifurcated jaw 16 as the flutter cam 19 is moved in a manner to be described in detail hereinafter.

The flutter cam 19 is secured to and rotatable with a longitudinally slidable cam drum or pin barrel member 23, Fig. 1, driven by a motor M as described hereinafter and having limit stops for its longitudinal movement. As the flutter cam 19 moves past followers 17 and 18, it will cause the flutter lever 9 to undergo either a clockwise or counter-clockwise movement about pivot 13. The spring 14, Fig. 6, normally urges the flutter lever 9 in a clockwise direction and accordingly holds the flutter cam 19 and the pin barrel 23 at its right hand stop position. With the power driven pin barrel member 23 at its extreme right position a left apex 21 of the flutter cam 19, as it moves past and engages cam follower 17 (Fig. 6) rocks the flutter lever 9 counterclockwise against spring 14 carrying its stop 12 out of the path of armature 5. This instant condition is shown in Fig. 6. As the inclined portion of the flutter cam between left hand apex 21 and right hand apex 20 passes through the jaw 16 of the flutter lever 9, the right hand apex 20 engages cam follower 18 and permits spring 14 to rock the lever 9 in a clockwise direction. If at that instant, the line signal is such that the armature 5 is in its left hand position, the complete motion of the flutter lever 9 will be permitted and the pin barrel 23 will accordingly remain in its normal right hand position. If at such an instant, however, the signal then being received is such that the armature 5 is in its right hand position, the stop 12 of the flutter lever 9 will engage with the projection 6 on the armature 5. The movement of the flutter lever 9 will accordingly be arrested. Inasmuch as lever 9 cannot move, the flutter cam 19 will be forced to the left as its right apex 20 passes cam follower 18. In this manner the pin barrel 23 will be moved to the left in accordance with a received marking impulse or will remain at the right in accordance with a received spacing impulse.

The pin barrel is rotated at a speed which is in synchronism with the speed of code impulses, each impulse being received just before the right hand corrugation is engaging the follower 18 and tending to rock the flutter lever 9 in a clockwise direction. With the pin barrel in its extreme right hand position, the apex 21 engaging follower 17 holds the projection 12 of the flutter lever 9 out of the path of the stop 6, leaving the armature free to operate.

From the above description, it will be noted that the flutter lever 9 acts as a combined flutter lever and spring lever for the pin barrel 23, inasmuch as the spring 14 provides the energy which, acting through the follower 17, forces the pin barrel 23 to the right. During the rotation of the pin barrel 23 and in response to a marking impulse which moves armature 5 to the right so that projection 6 is in the path of stop 12, the follower 17 engages and follows the corrugation at the projection 21 by the action of spring 14 until stop 12 engages the projection 6 on the armature 5 whereupon further movement of the flutter 9 is arrested. An instant later the outwardly sloping portion of the cam projection 20 engages the follower 18 and as a result of further rotation of cam 19 the pin barrel 23 is moved to the left.

In order to insure synchronous operation, the pin barrel 23 is rotated on the start-stop principle, the start and stop impulses controlling the rotation of the selector cam drum or pin barrel 23 in unison with the remote transmitting distributor, Fig. 3, which is transmitting the code combinations of impulses to which the receiver is responsive. By this unison of operation, the code signals sent out by the transmitter may be properly received by the selecting mechanism and translated. The pin barrel is normally held against rotation. To this end there is connected with the cam drum 23, a cam drum stop arm 24, Fig. 1, arranged to engage a stop lug 25 which may be carried on the frame of the apparatus by an orientation adjustment. The engagement of the stop arm 24 with the stop lug 25 occurs only when the cam drum or pin barrel is in its left hand position. This condition is obtained when the pin barrel 23 having rotated to a position at which stop arm 24 engages lug 25 a marking impulse is received. In response to a marking impulse at this instant, the armature 5 is moved to its right hand position and as the flutter lever 9 is rocked clockwise by the right hand apex 22 engaging the follower 18, the armature 5 and flutter lever 9 engage as described above and the flutter cam 19 is moved to the left, moving the cam drum or pin barrel 23 in a similar direction until the stop arm 24 engages stop lug 25. Engagement of these two prevents rotation of pin barrel 23 as will be described, which is the normal stop condition. A received spacing impulse will rock the armature 5 to the left releasing thereby the flutter lever 9. Spring 14 now moves the flutter lever 9 and through flutter cam 19 shifts the cam drum or pin barrel 23 to the right, withdrawing stop arm 24 from engagement with the stop lug 25.

The cam drum or pin barrel 23 is now rotated by motor M as will now be described. As shown in Fig. 1, the pin barrel 23 is loosely mounted on a main shaft 26 journaled in the brackets 29 and 30 of the frame, the rear end portion of the shaft 26 having keyed thereto a flanged bushing 31.

Secured to the flanged bushing 31 is a worm gear 32 in meshing engagement with a worm 34 mounted on the shaft of the motor M. Nuts 33 on the shaft 26 retain the bushing 31 and gear 32 in position. The forwardly extending end of the shaft 26 carries a sleeve 27 retained in position by the nuts 35 and on which the unitary assembly of cam drum or pin barrel 23, flutter cam 19 and cam drum stop arm 24 is adapted to slide.

Mounted on the shaft 26 between bracket 30 and the cam drum 23 is a frictional clutch 36. A flanged sleeve member 37 comprising a tubular sleeve having an integral flange is keyed upon the shaft 26 and mounted rotatively on the sleeve 37 is a friction driven disk 38, and non-rotatably a plate 39 between which a friction member 40 as, for example, a felt annular pad is placed, a similar friction member 40 being positioned between the driven disk 38 and the flange of the sleeve member 37. The plate 39 is engaged by the slit annular spring 41 which presses against the disk 42 in threaded engagement upon the tubular end of the sleeve member 37 and held in position by means of a locknut, the tension of the spring 41 being regulated by the disk 42 and its locknut.

The driven disk 38 which is urged by the motor M, through shaft 26 and friction clutch 36 of which it forms a part, at all times is in operative relation with the cam drum 23 through the medium of the cam drum stop arm 24. The stop arm 24 has a lateral portion which passes through a slot in driven disk 38 so that when this disk rotates, the drum 23 rotates with it. When the cam drum 23 is in its left stop position as described above, the cam drum stop arm 24 engages the stop lug 25 and as a result the driven flange member 37 and plate 39 will slip with respect to the restrained disk member 38 and the cam drum will be held stationary.

In response to a start impulse, sleeve 23 is moved to the right as described above and the stop arm 24 is moved out of engagement with the stop lug 25. The cam drum 23 is thereupon rotatively driven through clutch 36. In this manner the transmission of a starting or spacing impulse starts the cam drum revolving.

The speed of rotation of the cam drum 23 is such that when the transmitting distributor has revolved a sufficient distance to transmit the first code impulse the cam drum is revolved to the proper position to distribute the signal. When the transmitter has revolved to the position to transmit the second code impulse, the selector cam drum will also have rotated to a corresponding position and so on. At the end of the revolution, after the fifth impulse has been received, as will be described, the reception of the stop impulse which is a marking impulse in this case, rocks the end 6 of the armature 5 to the right, bringing it into the path of the flutter lever 9. The two will thereupon engage as described above and move the drum to the left or stop position. At this period in the revolution, the drum has made a complete revolution and stop arm 24 is in operative relation with stop lug 25 and when the drum is moved to the left, the two engage bringing the drum to a stop.

The cam drum 23 comprises a tubular structure with ten distributor cams 45' projecting from its outer surface. Five of these cams are marking cams and five are spacing cams.

Associated with each pair of distributor cams 45'; that is, a pair comprising a spacing and a marking cam, is one of five selector levers 46, Fig. 4, pivotally mounted on a shaft 52 suitably carried by the frame, and on the same horizontal line as shaft 26. Each of said levers 46 comprises arms 48 and 49 located respectively above and below the cam drum 23. The ends of the arms 48 and 49 are offset with respect to each other, the lower or marking arm 49 being offset toward the back and upper or spacing arm 48 being offset toward the front of the printer (see Fig. 1). This is done so that when the marking cams line up with the marking arms 49, the spacing cams will pass to the rear of the spacing arms 48 and when the spacing cams are in line with the spacing arms 48, the marking cams will pass to the front of the marking arms.

Accordingly, in response to a marking impulse the cam drum 23 is moved to the left as described above, the arm 49 of a selector lever 46 will be engaged by its associated marking cam 45', and its associated spacing cam will pass by the arm 48. As a result of the engagement of the cam 45' with the arm 49, the selector lever 46 is rocked about its pivot 52 in a counterclockwise direction, and out of the position shown in Fig. 4. On the other hand, in response to a spacing impulse the cam drum 23 will remain in the right hand position, as described above and the spacing cam 45' individual to the selector lever 46 will engage the arm 48 rocking the selector lever 46 in a clockwise direction about the pivot 52 and into the position shown in Fig. 4. In this manner the selector levers 46 are set each in one or the other of its positions in accordance with the received code.

Selector levers are carried in a selector lever unit or guide 50 located to the right of the cam drum 23 which functions to hold the selector levers 46 in position so that they can be moved to either the spacing position or marking position by the distributor cams 45', as described above. The selector levers are mounted in slots 51 in the guide 50, Fig. 1. These selector levers have no normal position but each remains set in either operated position until the impulse in a succeeding code is such as to shift it to the opposite position.

In order to insure against accidental movement of the selector levers to an alternate position, a latching means is provided. A jockey 46' pivotally mounted on the pivot 47' is normally urged about the pivot 47' by a compression spring 48'. The jockey 46' engages the edge of the selector lever in one position and the top of the lever in the opposite position. A jockey such as jockey 46' is provided for each of the selector levers and is individual thereto.

Each of the selector levers 46 is provided with a pair of downwardly extending diverging arms 53 and 54 adapted to operatively engage the projections 55 and 56 respectively of a transfer T-lever 57 associated with each selector lever 46. Each transfer lever 57 is in alignment with the selector lever 46 above it and is pivotally mounted on a pivot shaft 58 carried by a transfer bail 59, Fig. 1, mounted on the transfer bail shaft 60, suitably attached to the frame. The transfer bail 59 is provided at its end with a roller or cam follower 61, Figs. 1 and 7, and is in operative relation with a groove in the face of a main or operating cam 62.

The main or operating cam 62 is located to the rear of the cam drum 23 and is mounted on the main shaft 26 for rotatable movement with respect thereto and between the brackets 29 and 30 of the printer frame, the transfer bail roller or follower 61 being controlled by internal surfaces of a cam groove. The operating cam 62 is driven by a friction clutch 63 positioned on the main shaft 26 and to the right of said operating cam, the friction clutch being substantially identical with the friction clutch 36 described in detail above and comprising a driven disk 66, the clutch being assembled in the same manner as described above for the friction clutch 36. The operating cam 62 is driven by the friction clutch 63 by means of a suitable pin connection 72, Figs. 1, 4 and 7, positioned upon the operating cam 62 and passing through a notch in the driven disk 66. During predetermined periods in the operation, the driven disk 66 is held against rotation and cam 62 is therefore stationary. To this end the driven disk 66 has formed on its periphery adjacent the notch for the pin 72, a stop lug 73 adapted to be engaged by a trip bail 74 at a certain point in the cycle of operation. The trip bail 74 is pivotally mounted on transfer bail shaft 60 and is provided with a follower 75, Fig. 4, adapted to move on a cam portion provided on the driven disk 38. When the clutch 36 has been released and rotated over a predetermined distance, the follower 75 riding into a cammed portion of driven disk 38 rocks the bail 74, moving the trip bail out of engagement with stop lug 73.

When the trip bail 74 disengages the stop lug 73, the clutch 63 will be released to rotate the operating cam 62.

Slidably mounted on the main shaft 26 and to the left of the operating cam 62 is a sleeve member 76 splined to the hub of the operating cam 62. The sleeve member 76 is the sliding element of a toothed or grab clutch 78, the fixed member 79 of which is keyed to the main shaft 26, directly to the right of the bearing 29, Fig. 1. Formed on the sleeve member 76 is a flange having a side cam surface 80, Fig. 1 adapted to engage a fixed cam follower 81, the member 76 being normally held to the right out of engagement with the keyed member 79 against the tension of a coiled spring 82 positioned between the member 76 and the operating cam 62. The initial movement of the operating cam 62 and sleeve member 76 as described above rotates cam 80 until the cam follower 81 rides off of the shoulder of the cam 80 and the sleeve member 76 is moved to the left by action of spring 82 engaging the keyed member 79 on the main shaft 26. In this manner the main or operating cam 62 is started slowly at first from power through the friction clutch 63 and after a short initial movement is directly and positively coupled to the drive shaft through the grab clutch.

As the main cam 62 rotates, the transfer bail roller 61 rocks the bail 59 and moves pivot shaft 58 and the transfer levers 57 carried thereon upward toward selector levers 46 and the transfer levers 57 are forced against their individual selector levers 46, Fig. 4. As the transfer levers 57 engage selector levers 46, they will be rocked about their pivots 58 in either a clockwise or counterclockwise direction depending on the setting of the selector levers. If selector lever 46, for example, has been rocked counterclockwise in response to a marking setting of drum cam 45' the arm 54 will engage the extension 56 rocking the transfer lever 57 clockwise as the transfer lever is moved toward the selector levers 46. Should the selector lever 46 remain unchanged from the prior cycle of operation, arm 56 will pass arm 54 without engaging and the transfer lever 57 will remain unchanged.

Each of the transfer levers 57 is provided with a head 83, Fig. 4, projecting into a slot 84 of an individual notched selector disk 85, one such disk being provided for each of the transfer levers 57. Selector disks 85 are freely supported for relative rotation on a sleeve 86, Figs. 4 and 7, supported in the framework, and are disposed between guiding plates 87 and 87'. The selector disks 85 are provided with V-shaped notches cut along their circumferential edges 88. As will appear from the following, each disk has two positions. For each combination of setting of these disks, corresponding V-shaped notches on each disk will be in alignment with each other. At right angles to the circumference of the selector disks 85 and guided in slots in the guide plates 87, 87' and a supporting member 90, are a series of stop members 89 provided with cam rollers 91. Each of the stop members 89 is pivotally or otherwise carried on the periphery of the supporting member 90 and is formed with two bowed or depressed portions 92 between the supporting member 90 and the guide plate 87', the depressed portions 92 being adapted to receive circular coiled radially contractible springs 93, by the action of which the stop members 89 are urged into engagement with the edges 88 and the V-shaped notches of disks 85.

With five disks there are thirty-two possible combinations and accordingly any one of thirty-two stop pins may be selected.

As each of the transfer selector levers 57 is rocked about its pivot 58 as described above, it will in turn move the head 83 moving the associated selector disk 85 to either of its two operative positions. If the transfer lever 57 is rocked clockwise, it will rotate its associated disk 85 counterclockwise. As the disks assume new positions, a new alignment of the notches will occur permitting one of the stop pins 89 to drop therein as described above, and at the same time lifting the prior pin 89.

It will be noted from the description thus far given that although the selector cam drum 23 is operated successively, and although the code impulses are received and in turn successively position the selector levers 46, the transfer operation for setting the selector disks 85 takes place in a single operation as a result of the movement of the transfer levers 57 by the transfer bail 59 operating on the main cam 62. As soon as this transfer has taken place, the selector levers 46 are free for re-operation in accordance with a new permutation while the selector disks 85 selectively control an operation as will now be described.

Figure 7:
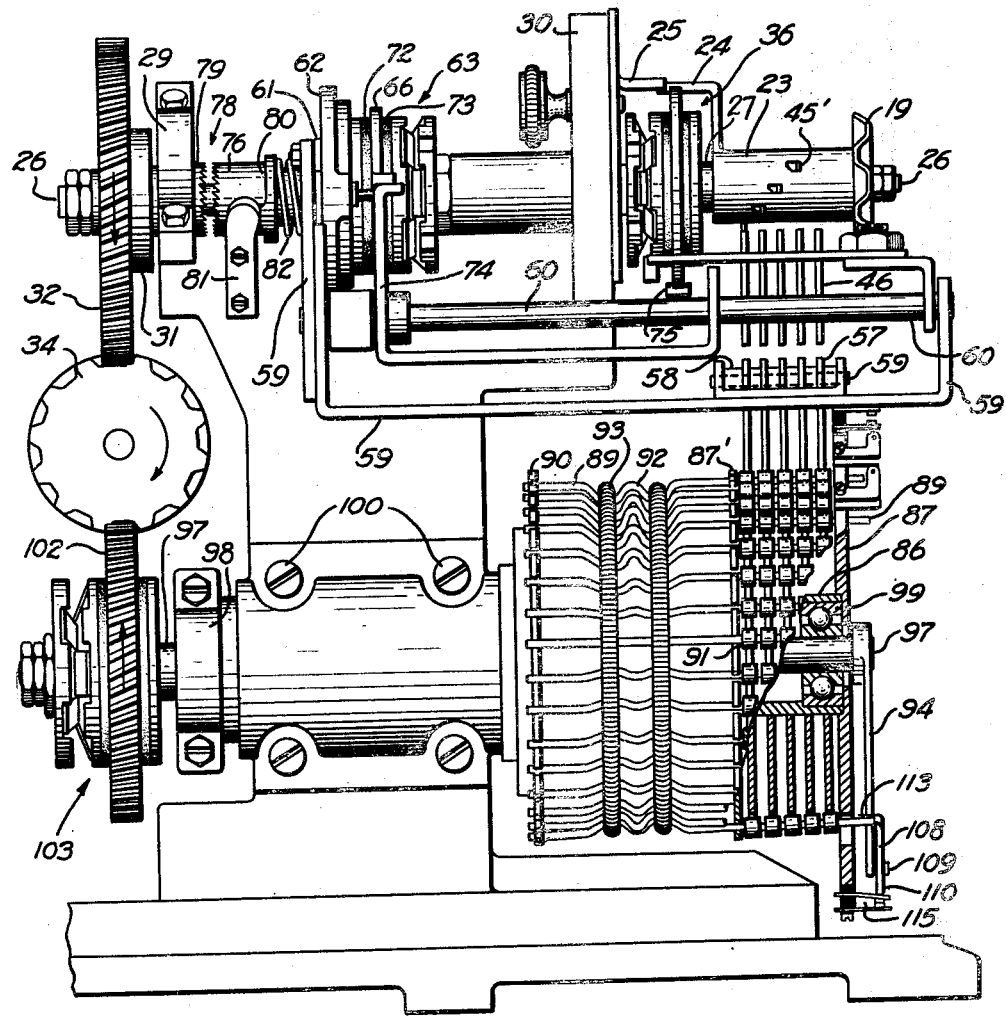
Fig. 7 is a side view of the apparatus with part in section.

Rotating in operative relation with the stop pins 89 is an index arm or stop arm 94, Figs. 4 and 7. The stop arm 94 is secured to a shaft 97 for rotation therewith. The shaft 97 is mounted in anti-friction bearings 98 and 99, one of which is carried in the end of the sleeve member 86 which is rigidly secured to the frame in any suitable manner as, for example, by means of the bolts 100. The shaft 97 is driven by means of a gear 102 operatively connected to the motor worm 34. Power is transferred from the motor and gear 102 to the shaft 97 through the drive disk of a friction clutch 103, Fig. 7 mounted on the inner end of the shaft 97. The friction clutch 103 is substantially identical in structure with the friction clutches 36 and 63 described above. The shaft 97 thus always tends to rotate, but may be stopped when the index or stop arm 94 engages an operated one of the index stop pins 89. These stop pins normally are, all but one, out of the path of the stop arm 94. When one of these stop pins is dropped into a row of aligned notches of the selector disks 85, the pin 89 moves into the path of the stop arm 94 and will engage it when the stop arm 94 reaches it, bringing the shaft 97 to a stop thereat. In this manner the shaft may be selectively stopped at any position in its rotation. With the shaft 97 stationary, the friction clutch 103 will slip, i. e., the gear 102 will still rotate due to its direct connection with the motor M.

The stop arm 94 is equipped at its end with a striker 108 pivoted at 109 to arm 94 and provided with a striking end 110. Secured at one end to the end 110 of the striker 108 and at the other end to a projection 111 on the stop arm 94 is a spring 112 which maintains the member 108 in a non-operative position when the stop arm 94 rotates with the shaft 97. Striker 108 is also provided with lugs 113 projecting from the ends thereof to engage the arm 94.

Arranged about the circumference of the face plate 87 are a plurality of pairs of cooperating contact members such as 115 to 118 each pair being carried on an insulating block 119 on the face plate 87. These contacts 115 to 118 are selectively closed under control from the operating station.

Referring to Fig. 2, the windings 3 and 4 of the armature 5 are connected over a wire 4' to the armature 122 of the relay 123 which forms a part of a radio receiving set 124. In Fig. 3, the sending station 130 has a keyboard 132 with keys 1 to 8 and "CO" arranged according to the principles of automatic telegraphy to control selectively the closing of a combination of contacts 133 in variant permutations according to the signal to be transmitted.

In addition to the selectively operated contacts 133, the keyboard is also provided with a normally closed stop contact 134 which keeps the energy of battery 135 on the wire 136 and is opened to transmit a start signal to the remote station in a manner to be described more fully hereinafter. This keyboard may be of the type shown in the patent to Krum et al., 1,374,152 issued April 5, 1921, although it will be understood that any other transmitter as, for example, a tape controlled, single contact transmitter may be used. In the particular transmitter chosen to illustrate the invention, the operated contacts for a code are sequentially associated with the signalling circuit in a manner well known in the art and a group code of unit signals is transmitted. Although as shown the keys carry designations of numerals and letters, it will be understood that for the purpose of the present invention, designations of the desired remote operations will preferably appear on the key levers.

An amplifier and radio transmitter 137 with antenna 138 converts battery signals impressed upon wire 136 into radiant energy signals upon the antenna 138.

At remote station 140, a receiving antenna 141 is connected to an amplifier-detector 124, the output circuit of which controls a relay 123 which in turn by its contacts controls the current through a line wire 4'.

In Figs. 2 and 3, the idle condition is the continuous connection of battery 135 to the wire 136 at the station 130, the transmission of no radiant energy from antenna 138 to antenna 141, the continuous connection of armature 122 with its back contact, and a continuous negative or marking current over wire 4' and through windings 3 and 4, thus holding the tip 6 of the armature 5 in its right hand position, in which position it obstructs the movement of the flutter lever 9.

In operation, briefly, the controlling station 130 sends a start-stop code which at the remote radio receiver 124 operates the relay 123 and thus operates the armature 5 to control the selector levers of Figs. 1, 4 and 7, to set the disks 85 in a determined combination to permit a desired stop pin 89 to operate toward the shaft 97. The arm 94 through its striker 108 immediately engages the stop pin, which engagement operates the striker 108 and stops the arm 94 and thereafter the parts 89, 94 and 108 remain as thus adjusted until a subsequent operation of the disks 85 lifts the operated pin 89 and operates another pin 89, at which time the arm 94, now released from the lifted pin 89, moves to the now operated pin 89 and stops, operating the striker 108 about its pivot when stopping.

As the arm 94 rotates, the end 110 of the striker 108 is, as described above, held from operating position by the spring 112. When, however, the lug 113 of the striker 108 engages the operated pin 89, the striker 108 is rocked about its pivot 109 in a clockwise direction and the striker end 110 engages and closes the contacts such as 115 opposite which it is at that time positioned. The striker is operated to close the contacts by power from the motor M, not by power from the spring 112.

It will be noted that not all of the pins 89 when in operated position will cause closing of a pair of contacts. Thus in the illustration chosen the alternate pins starting with the pin shown operated each control a pair of contacts and the other pins when operated are ineffectual in performing any operation. This is accomplished by the relative positions of pins 89 with respect to the contacts 115—118. The pin shown in operated position rocks the striker 108 at the instant when the end 110 is adjacent contacts 115. Clearly, however, the succeeding pin if moved to the operated position will rock the striker 108 at the instant when the end 110 is between contacts 115 and 116. The next pin, however, if in operated position will rock striker 108 to close contacts 116. This arrangement is repeated for each successive pair of pins and for the contacts. It will be understood, however, by those skilled in the art that this particular arrangement is merely employed to illustrate the invention and that any variation of contact operation by the pins may be employed, for example, a successive pair of pins may be operated to close contacts followed by one not operative and this particular combination may in turn be changed. It is desired here to illustrate a principle of remote control by codes in which only certain of the codes are effective for control and in which, as will appear more fully hereinafter, a control operation may be performed by a number of successive code combinations of impulses.

Figure 5:
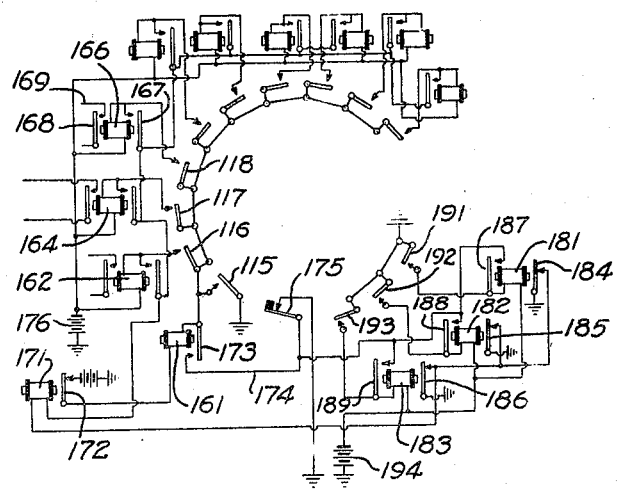
Fig. 5 shows the circuits of the operating contacts and their relays.

The effects of closing contacts 115 by the striker 15 will now be described in connection with electrical circuits shown in Fig. 5.

As herein shown the contacts 115 control a circuit for a relay 161 whereas the second set of contacts 116 control the circuit for a relay 162. Similarly each of the succeeding contacts such as 117 and 118 control individual relays 164 and 166. Each of these relays is provided with two armatures, one armature 167 of relay 166 when operated electrically locking the relay and a second armature 168 closing a control circuit 169 extending to a unit to be operated. The locking circuit for each of the relays 162, 164, 166, etc. is completed over a circuit including a relay 171 as will appear more fully hereinafter. The relay 161 is provided with an armature 173 over which ground from conductor 174 and switch 175 is extended to the control relays 162, etc.

As will be described more fully hereinafter, the energization of any of the relays 162, 164 or 166 is dependent upon the energization of the first relay 161 and the operation of any of these relays in turn prevents the energization of any of the other relays during that cycle of operations; that is, the operation of any of the relays 162, 164 or 166 renders further control operations from the remote station ineffectual until the operated relay is restored to normal by the transmission of predetermined signals to energize the relays 181 to 183 which when energized restore the apparatus to normal as described herein. Relays 181 to 183 are provided with armatures 184 to 186 for controlling the restoring operations and armatures 187 to 189 for locking the relays. Contacts 191 to 193 controlled by individual pins close the circuits of magnets 181 to 183. It will be clear from the above description that the stop arm 94 tends to rotate in a clockwise sense in Figs. 4 and 5 due to its friction clutch. Arm 94 is stopped each time it engages any selected pin 89 and is released to continue its rotation only when a new selection is made, whereby the previously selected pin 89 is released and another pin is dropped into operating position.

A complete cycle of operations of the system will now be described. It will be assumed that the operator desires to perform any operation to be effected by the circuit 169 of the relay 166.

In order to perform this operation the operator will transmit a code such that a predetermined pin 89 will be operated which will cause the striker 108 to close the contacts 115. A circuit is thereupon completed for the relay 161 from ground through the contact 115, winding of the relay 161 and through the armature 172 to battery and ground. As a result of the energization of the relay 161, a locking circuit is completed therefor from ground through battery, contact and armature 172 winding of relay 161 its armature 173 in engagement with its front contact over the conductor 174 and contact of switch 175 to ground. The relay 161 is thus maintained energized even after the striker 108 has abandoned the contacts 115 and these have reopened.

The operator will now transmit a second code, as a result of which the disks 85 will align their notches to permit the pin 89 opposite the contacts 118 to move to its operated position and the striker 108 upon engagement with this pin will cause the contacts 118 to close. As a result a circuit will be completed from ground through battery 176 through the winding of the relay 166 over the contact 118, armature 173 and its front contact, conductor 174 and contact 175 to ground. One result of the energization of the relay 166 is to operate its armature 167 to its front contact and a circuit is now completed for the relays 166 and 171 in series from ground through battery 176, winding of the relay 166, front contact and armature 167 through the winding of the relay 171 and back contacts of the armatures 184, 185 and 186 in multiple to ground. As a result of this circuit, the relay 171 is energized and opens the locking circuit of the relay 161 at armature 172. The relay 161 is thereupon deenergized, removing ground from all of the contacts 116 to 118 which were previously conditioned for operation. In the manner described above the operation of any one of the control relays 162, 164, 166, etc., first depends upon the energization of the relay 161 and in turn upon energization opens the circuit of the relay 161 preventing the energization of any other of the control relays. As will now be clear from the above, the energization of relay 166 maintains the circuits of all the other control relays non-operative. If, therefore, a code were received at this time for operating the various contacts 116, 117, etc., these would close but would be ineffectual in closing the circuits of their individual control relays, the circuits therefor being further open at armature 173. Relay 161 cannot be energized at this time as its circuit is open at armature 172. Relay 166 being now energized is therefore the only control relay which can be energized at this time.

A further result of the energization of the relay 166 is to close the circuit 169 controlled by the armature 168. This circuit extends to the remote unit which is to be operated. Inasmuch as the particular operation which is performed on this circuit is immaterial as far as this invention is concerned, this is not shown, although it will be understood that any operation such as operating mechanical control levers, fuel valves, steering mechanism and circuit breakers may be performed.

As explained above, no other control operation can occur at this time. It will be further understood that a large variety of successive codes may be transmitted to operate the relay 161. Thus, for example, the codes which control the operation of all of the ineffectual pins 89 may be transmitted and inasmuch as all of these perform no operation on the contacts nothing will occur until the code which closes the contact 115 is received. It is clear that thereafter a variable number of successive and variant code combinations of impulses may be sent to operate the relay 166. The arm 94 now is stopped by the first pin 89, and to operate the points 118 the arm 94 must be stopped by the seventh pin 89, but in the meantime, it may be stopped by the second or fourth or sixth pin 89 or by all of those in succession without effect. The code for operating the first pin 89 may be followed immediately by the code for the seventh pin 89 or codes for one or all of the second, fourth and sixth pins may be interposed. In this manner any listener-in either on the radio link or the signalling lines 4' and 136 will be confused inasmuch as he would not be able to tell which of the impulses is the operating impulse and inasmuch as the code for any one operation may be different when repeated, he will be unable to remotely detect the proper code for performing the remote operation.

It will be clear to those skilled in the art that the circuit closed at armature 168 may provide a direct control of the apparatus in this circuit, by the operator.

In order to recondition the apparatus to normal nonoperation, the remote operator will now transmit the codes for closing contacts 191, 192 and 193. As in the case of the contacts described above, a variable combination of codes may be transmitted to close these three contacts. Thus, for example, the code for operating the pins 89 associated with these three contacts may be transmitted or a code for operating the pin 89 preceding contact 191 or for operating those interposed between contacts 192 and 193 may also be transmitted, these latter pins when operated having, however, no effect. It will be assumed the operator transmits three successive codes and closes successively contacts 191, 192 and 193. As a result of the closing of contact 191, a circuit is completed for the relay 181 from ground through battery 194 winding of relay 181 and contact 191 to ground. Upon the closing of the contacts 192, a similar circuit is completed for the relay 182 and upon the closing of contact 193 a similar circuit for the relay 183.

Upon energization of relay 181, a locking circuit is completed therefor from ground through the contact 175 and front contact and armature 187 and through the winding of the relay 181 to battery and ground. When now the contact 191 is opened as the arm 47 starts, the relay 181 will remain energized. Similarly upon energization of relay 182, the locking circuit therefor is completed over the contact 175 and upon energization of relay 183 a locking circuit therefor is completed over the contact 175.

A further result of the energization of the relays 181 to 183 is to move the armatures 184 to 186 to disengage their back contacts and thus to open the locking circuit for the relays 166 and 171 in series as traced above. Relay 171 thereupon deenergizes and prepares the energizing circuit for the relay 161 at the armature 172. Relay 166 deenergizes and opens its own locking circuit at armature 167 and the control circuit at armature 168.

Following the deenergization of the relays 166 and 171 in the manner described above, and upon receipt of the next code, the arm 94 engages the contacts 175 in passing and the locking circuits for the relays 181 to 183 are opened as this contact is moved to its open position by the striker 108 although retracted by spring 112. The apparatus is thus restored to its non-operating condition, after which the operations described above can be repeated. Any of the relays 162, 164, etc., can then be operated following the energization of relay 161 for further control operation.

It will now be clear from the above description that to perform any control operation it is necessary to transmit a predetermined code which will close the circuit for energizing the relay 161. Due to the optional use of non-effective codes, there are numerous combinations which will result in the energization of any one of the selector control relays 162—166. Following the energization of any one of these relays no other control relay can be energized until the system is restored again to its normal condition after which the control cycle for another unit may be repeated. It will be clear from this, that a secret remote control system is provided in which only the operator knowing the particular desired combination can perform the necessary remote control operation.

It will be clear to those skilled in the art that there is here disclosed only one of numerous illustrations for applying the principles involved in this invention.

The principles disclosed may include many other adaptations and accordingly the invention is not limited by the illustrations chosen to describe the invention.

The invention claimed is:

1. In a remote control system, a plurality of relays, selecting apparatus comprising a plurality of disk members, a rotary member and stop pins in operative relation with said disk members responsive severally to received code combinations of impulse conditions for selecting one of said relays for operation, said relays being normally non-responsive to the operation of said selecting apparatus, a further relay and a locking circuit therefor operable by said selecting apparatus in accordance with a predetermined code combination of impulse conditions for rendering said plurality of relays responsive, holding means whereby one of said relays upon operation remains operated independent of said further relay and unlocks said further relay, and alternative means operable by said rotary member for unlocking said further relay.

2. In a remote control system, a plurality of devices, selector apparatus comprising a plurality of disc members, means for registering upon said disc members individually the several individual impulse conditions of a received code combination, stop pins in operative relation with said disc members responsive severally to received code combinations of impulse conditions for selecting one of said devices for operation, mechanism normally holding said devices non-responsive to operation of said pins, a rotating member cooperating with said pins, said mechanism operable by one of said pins and said rotary member in response to a predetermined code combination of impulse conditions for conditioning all of said devices for operation, means controlled by an operated one of said devices for restoring said mechanism to normal and for rendering the remaining of said devices non-responsive to said pins and said rotary member whereby only one of said devices can be operated at a time, and means operable by said rotating member in each cycle of rotation for restoring said mechanism to normal.

3. In a remote control system, a plurality of devices, selector apparatus comprising a plurality of disc members, means for registering upon said disc members individually the several individual impulse conditions of a received code combination, stop pins in operative relation with said disc members responsive severally to received code combinations of impulse conditions for selecting one of said devices for operation, a further device normally rendering said first mentioned devices non-responsive to said pins, a holding means therefor, a rotatable arm cooperating with said stop pins, said stop pins being normally out of the path of said arm and conditioned into the path of said arm in accordance with the operation of said discs, said further device operated by one of said stop pins and said arm in response to a predetermined code combination of impulse conditions for conditioning all of said first mentioned devices for operation, means controlled by a selected and operated one of said first mentioned devices for restoring said further device to normal and for rendering said further device non-responsive to said stop pin whereby only one of said first mentioned devices can be operated at a time, alternative means operable by said arm for restoring said further device and third devices responsive to said stop pins and said arm in response to predetermined combinations of impulse conditions for restoring said operated first mentioned device to normal.

4. In a remote control system, a set of remotely controllable code discs, means for transmitting groups of signals to control the setting of said discs, circularly arranged stop pins operable by said discs, electrical switches, a rotatable arm operable to stop in response to an operated stop pin to effect the operation of one of said switches, a circuit controlled by said operated switch, and means operated after the closure of said circuit and in response to the actuation of another switch in accordance with the remote selection of a stop pin.

5. In a remote control system, a set of remotely controlled stop members, a rotating arm adapted to cooperate with said stop members, a switch operated by said arm when in engagement with a member, a circuit controlled by said operated switch, means operated after the closure of said circuit and in response to the actuation of a subsequent switch in accordance with the remote selection of a stop member, and means operated on each cycle of operation of said arm for opening said circuit.

6. In a remote control system, a set of remotely controlled stop members, a rotating arm adapted to cooperate with said stop members, a switch operated by said arm due to its engagement with a member, a circuit controlled by said operated switch, a relay included in said circuit and energized upon the closure thereof, means operated when said relay is energized and when another stop member is selected for closing a further circuit, and means actuated once in each cycle of rotation of said arm for effecting the deenergization of said relay.

7. In a remote control system, a plurality of circularly arranged remotely controllable stop pins, a plurality of relays, each individual to a stop pin, a switch for each stop pin, a rotatable member cooperating with said stop pins to operate said switches to energize said relays upon the selective operation of said pins, a further relay energized by a switch through the cooperation of said member with a particular stop pin, and a circuit controlled by said further relay for conditioning said other relays for energization upon the subsequent selection of another pin and its engagement by said member.

ALBERT H. REIBER.